(12) United States Patent
Torii

(10) Patent No.: US 8,749,569 B2
(45) Date of Patent: Jun. 10, 2014

(54) INFORMATION PROCESSING APPARATUS, INFORMATION PROCESSING METHOD, AND PROGRAM

(75) Inventor: Kuniaki Torii, Kanagawa (JP)

(73) Assignee: Sony Corporation, Tokyo (JP)

( * ) Notice: Subject to any disclaimer, the term of this patent is extended or adjusted under 35 U.S.C. 154(b) by 714 days.

(21) Appl. No.: 12/688,629

(22) Filed: Jan. 15, 2010

(65) Prior Publication Data

US 2011/0090235 A1  Apr. 21, 2011

(30) Foreign Application Priority Data

Jan. 16, 2009  (JP) ................ P2009-008029

(51) Int. Cl.
  *G09G 5/36*  (2006.01)
  *G06F 12/00*  (2006.01)
  *G06F 13/00*  (2006.01)
  *G06F 13/28*  (2006.01)

(52) U.S. Cl.
  USPC ............ 345/557; 345/556; 711/137; 711/113

(58) Field of Classification Search
  None
  See application file for complete search history.

(56) References Cited

U.S. PATENT DOCUMENTS

| 7,657,652 B1* | 2/2010 | Balaji .................... 709/242 |
| 2009/0024819 A1* | 1/2009 | Fisher et al. ............ 711/170 |
| 2010/0005046 A1* | 1/2010 | Segel ...................... 706/46 |

FOREIGN PATENT DOCUMENTS

| JP | 04-199325 | 7/1992 |
| JP | 05-088652 | 4/1993 |
| JP | 08-129474 | 5/1996 |
| JP | 08-272586 | 10/1996 |
| JP | 10-260810 | 9/1998 |
| JP | 11-306121 | 11/1999 |
| JP | 2001-134361 | 5/2001 |
| JP | 2003-030037 | 1/2003 |
| JP | 2006-243861 | 9/2006 |

\* cited by examiner

*Primary Examiner* — Maurice L McDowell, Jr.
*Assistant Examiner* — Donna J Ricks
(74) *Attorney, Agent, or Firm* — Finnegan, Henderson, Farabow, Garrett & Dunner, LLP

(57) ABSTRACT

There is provided an information processing apparatus including a storage unit for storing a transition frequency database storing transition frequency information representing a frequency of a state transition of a display content displayed on a display screen from a display state displaying the display content to another display state, and a cache control unit for predicting the another display state to which a transition may occur based on the transition frequency database and the display content displayed on the display screen, and preparing a resource needed by the another predicted display state before the transition occurs.

4 Claims, 11 Drawing Sheets

FIG. 6

|  | STATE 1 | STATE 2 | STATE 3 | STATE 4 | STATE 5 | STATE 6 | STATE 7 | STATE 8 | STATE 9 | STATE 10 | STATE 11 | STATE 12 | STATE 13 | STATE 14 | STATE 15 |
|---|---|---|---|---|---|---|---|---|---|---|---|---|---|---|---|
| STATE 1 | 0 | 4 | 0 | 5 | 0 | 0 | 0 | 0 | 0 | 0 | 0 | 0 | 0 | 0 | 0 |
| STATE 2 | 4 | 0 | 1 | 0 | 0 | 4 | 0 | 0 | 0 | 0 | 0 | 0 | 0 | 0 | 0 |
| STATE 3 | 0 | 1 | 0 | 0 | 0 | 0 | 0 | 2 | 0 | 0 | 0 | 0 | 0 | 0 | 0 |
| STATE 4 | 5 | 0 | 0 | 0 | 2 | 0 | 0 | 0 | 0 | 5 | 0 | 0 | 0 | 0 | 0 |
| STATE 5 | 5 | 0 | 0 | 2 | 0 | 0 | 0 | 0 | 0 | 0 | 1 | 0 | 0 | 0 | 0 |
| STATE 6 | 0 | 4 | 0 | 0 | 0 | 0 | 2 | 0 | 0 | 0 | 0 | 5 | 0 | 0 | 0 |
| STATE 7 | 0 | 0 | 2 | 0 | 0 | 2 | 0 | 0 | 2 | 0 | 0 | 0 | 0 | 0 | 0 |
| STATE 8 | 0 | 0 | 2 | 0 | 0 | 0 | 0 | 0 | 0 | 0 | 0 | 0 | 0 | 2 | 0 |
| STATE 9 | 0 | 0 | 0 | 0 | 0 | 0 | 2 | 0 | 0 | 0 | 0 | 0 | 0 | 0 | 2 |
| STATE 10 | 0 | 0 | 0 | 5 | 0 | 0 | 0 | 0 | 0 | 0 | 0 | 0 | 0 | 0 | 0 |
| STATE 11 | 0 | 0 | 0 | 0 | 1 | 0 | 0 | 0 | 0 | 0 | 0 | 0 | 0 | 0 | 0 |
| STATE 12 | 0 | 0 | 0 | 0 | 0 | 5 | 0 | 0 | 0 | 0 | 0 | 0 | 0 | 0 | 0 |
| STATE 13 | 0 | 0 | 0 | 0 | 0 | 0 | 2 | 0 | 0 | 0 | 0 | 0 | 0 | 0 | 0 |
| STATE 14 | 0 | 0 | 0 | 0 | 0 | 0 | 0 | 2 | 0 | 0 | 0 | 0 | 0 | 0 | 0 |
| STATE 15 | 0 | 0 | 0 | 0 | 0 | 0 | 0 | 0 | 2 | 0 | 0 | 0 | 0 | 0 | 0 |

FIG. 8

|  | STATE 1 | STATE 2 | STATE 3 | STATE 4 | STATE 5 | STATE 6 | STATE 7 | STATE 8 | STATE 9 | STATE 10 | STATE 11 | STATE 12 | STATE 13 | STATE 14 | STATE 15 |
|---|---|---|---|---|---|---|---|---|---|---|---|---|---|---|---|
| STATE 1  | 0 | 5 | 0 | 2 | 0 | 0 | 0 | 0 | 0 | 0 | 0 | 0 | 0 | 0 | 0 |
| STATE 2  | 5 | 0 | 1 | 0 | 0 | 5 | 0 | 0 | 0 | 0 | 0 | 0 | 0 | 0 | 0 |
| STATE 3  | 0 | 1 | 0 | 0 | 0 | 0 | 0 | 2 | 0 | 0 | 0 | 0 | 0 | 0 | 0 |
| STATE 4  | 2 | 0 | 0 | 0 | 2 | 0 | 0 | 0 | 0 | 2 | 0 | 0 | 0 | 0 | 0 |
| STATE 5  | 5 | 0 | 0 | 2 | 0 | 0 | 0 | 0 | 0 | 0 | 1 | 0 | 0 | 0 | 0 |
| STATE 6  | 0 | 5 | 0 | 0 | 0 | 0 | 4 | 0 | 0 | 0 | 0 | 5 | 0 | 0 | 0 |
| STATE 7  | 0 | 5 | 0 | 0 | 0 | 4 | 0 | 0 | 2 | 0 | 0 | 0 | 5 | 0 | 0 |
| STATE 8  | 0 | 0 | 2 | 0 | 0 | 0 | 0 | 0 | 0 | 0 | 0 | 0 | 0 | 2 | 0 |
| STATE 9  | 0 | 0 | 2 | 0 | 0 | 0 | 0 | 2 | 0 | 0 | 0 | 0 | 0 | 0 | 2 |
| STATE 10 | 0 | 0 | 0 | 2 | 1 | 0 | 0 | 0 | 0 | 0 | 0 | 0 | 0 | 0 | 0 |
| STATE 11 | 0 | 0 | 0 | 0 | 0 | 5 | 0 | 0 | 0 | 0 | 0 | 0 | 0 | 0 | 0 |
| STATE 12 | 0 | 0 | 0 | 0 | 0 | 0 | 5 | 0 | 0 | 0 | 0 | 0 | 0 | 0 | 0 |
| STATE 13 | 0 | 0 | 0 | 0 | 0 | 0 | 0 | 2 | 0 | 0 | 0 | 0 | 0 | 0 | 0 |
| STATE 14 | 0 | 0 | 0 | 0 | 0 | 0 | 0 | 0 | 0 | 0 | 0 | 0 | 0 | 0 | 0 |
| STATE 15 | 0 | 0 | 0 | 0 | 0 | 0 | 0 | 0 | 2 | 0 | 0 | 0 | 0 | 0 | 0 |

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and program.

2. Description of the Related Art

As a result of recent progress in information processing technology, various processings can be performed by a computer. In order to cause a computer to perform a processing, it is necessary to start various applications according to the processing to be executed, and in order to start an application, the computer needs a resource according to the application to be started. When the resource is appropriately prepared, a user of the apparatus can obtain a comfortable operational environment.

In order to appropriately prepare the resource, it is effective to estimate the needed resource in advance and execute a cache before a user of the apparatus performs operation. There are various kinds of techniques for controlling the cache, such as a technique carried out in hardware level and a technique relating to a scheduling algorithm between a processor and a memory. For example, Japanese Patent Application Laid-Open No. 2003-30037 discloses a method for a system including a server apparatus and a client apparatus, wherein a waiting time for communication processing is reduced by performing look-ahead caching based on a behavior model of a user provided by the server side.

SUMMARY OF THE INVENTION

However, caching control techniques in related art including the above technique described in Japanese Patent Application Laid-Open No. 2003-30037 is triggered by operation of software and hardware, and has a problem in that they may not necessarily achieve caching suitable for a user of an apparatus.

In view of the above problems and other problems associated with methods and apparatuses in related art, the present invention provides a novel and improved information processing apparatus, information processing method, and program capable of performing active caching by predicting operation of a user of the apparatus.

According to an embodiment of the present invention, there is provided an information processing apparatus including a storage unit for storing a transition frequency database storing transition frequency information representing a frequency of a state transition of a display content displayed on a display screen from a display state displaying the display content to another display state, and a cache control unit for predicting the another display state to which a transition may occur based on the transition frequency database and the display content displayed on the display screen, and preparing a resource needed by the another predicted display state before the transition occurs.

According to the above configuration, a storage unit stores a transition frequency database storing transition frequency information representing a frequency of a state transition of a display content displayed on a display screen from a display state displaying the display content to another display state. A cache control unit predicts the another display state to which a transition may occur based on the transition frequency database and the display content displayed on the display screen, and the cache control unit prepares a resource needed by the another predicted display state before the transition occurs.

The information processing apparatus may further include a state transition occurrence frequency analysis unit for analyzing an occurrence frequency of the state transition using history information storing a history of the state transition. The state transition occurrence frequency analysis unit may update a content of the transition frequency database based on the analysis result.

The state transition occurrence frequency analysis unit may calculate a frequency of the state transition based on the number of state transitions occurring in a same runtime and the total number of state transitions.

The information processing apparatus may further include a communication control unit capable of communicating with an apparatus arranged externally to the information processing apparatus. The transition frequency database may be transferred to the apparatus arranged externally to the information processing apparatus via the communication control unit.

The cache control unit may obtain the transition frequency database from the apparatus arranged externally to the information processing apparatus.

According to another embodiment of the present invention, there is provided an information processing method including the steps of predicting another display state to which a transition may occur, based on a transition frequency database storing transition frequency information representing a frequency of a state transition of a display content displayed on a display screen from a display state displaying the display content to the another display state and the display content displayed on the display screen, and preparing a resource needed by the another predicted display state before the transition occurs.

According to another embodiment of the present invention, there is provided a program for causing a computer having a display screen to execute the steps of predicting another display state to which a transition may occur, based on a transition frequency database storing transition frequency information representing a frequency of a state transition of a display content displayed on the display screen from a display state displaying the display content to the another display state and the display content displayed on the display screen, and preparing a resource needed by the another predicted display state before the transition occurs.

As described above, according to the present invention, caching can be actively performed because operation of the user is predicted based on the transition of the display screen.

BRIEF DESCRIPTION OF THE DRAWINGS

FIG. 6 is an explanatory diagram for illustrating one example of a transition frequency database;

FIG. 8 is an explanatory diagram for illustrating one example of a transition frequency database;

DETAILED DESCRIPTION OF THE EMBODIMENTS

Figure 1:
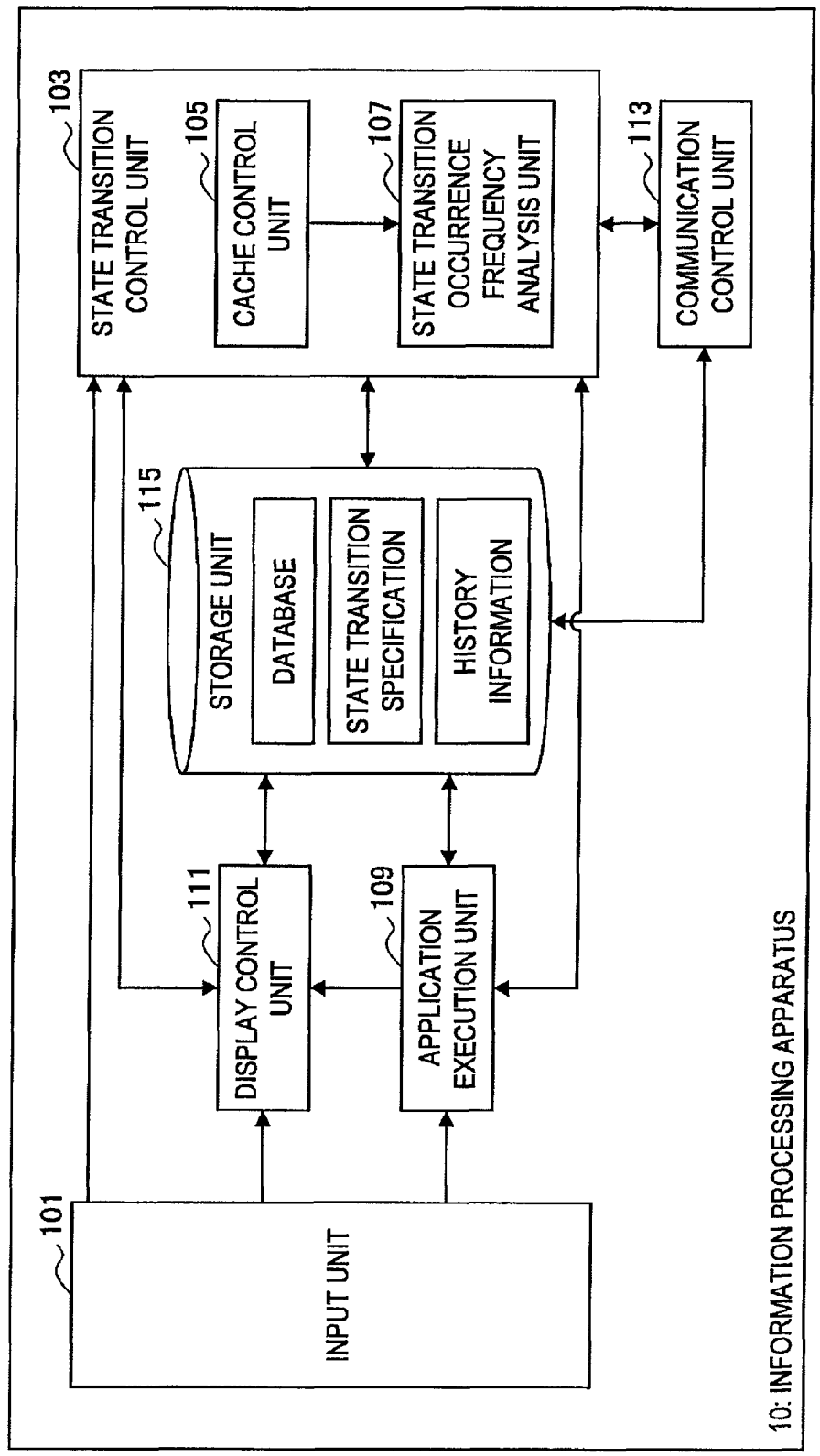
FIG. 1 is a block diagram for illustrating a configuration of an information processing apparatus according to the first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
(1) First Embodiment
  (1-1) Regarding configuration of information processing apparatus
  (1-2) Regarding information processing method
(2) Regarding hardware configuration of information processing apparatus according to each embodiment of the present invention
(3) Summary

First Embodiment

<Regarding Configuration of Information Processing Apparatus>

First, a configuration of an information processing apparatus according to the first embodiment of the present invention will be described in detail with reference to FIG. 1. FIG. 1 is a block diagram for illustrating the configuration of the information processing apparatus according to the present embodiment.

For example, as shown in FIG. 1, the information processing apparatus 10 according to the present embodiment mainly includes an input unit 101, a state transition control unit 103, an application execution unit 109, a display control unit 111, a communication control unit 113, and a storage unit 115.

The input unit 101 is constituted by, for example, a CPU (Central Processing Unit), a ROM (Read Only Memory), a RAM (Random Access Memory), and an input device. The input unit 101 converts operation performed by a user of the information processing apparatus 10 with the input device such as a mouse and a keyboard into a predetermined signal corresponding to the operation. Thereafter, the input unit 101 transfers the converted signal to a corresponding processing unit. For example, when a user operates a mouse to move a position selection object such as a mouse pointer, the input unit 101 generates a signal representing a movement of the position selection object and transfers the signal to the state transition control unit 103 and the display control unit 111, which are explained later. Alternatively, when a user operates a mouse, a keyboard, and the like to select a start of an application, the input unit 101 generates a signal representing the selected application and transfers the signal to the state transition control unit 103 and the application execution unit 109.

The state transition control unit 103 is constituted by, for example, a CPU, a ROM, and a RAM. The state transition control unit 103 controls transition of a display state of a display content displayed on a display screen based on the signal relating to the user operation transferred from the input unit 101 and information about the state of the display screen obtained from the later-described display control unit 111.

Figure 2:
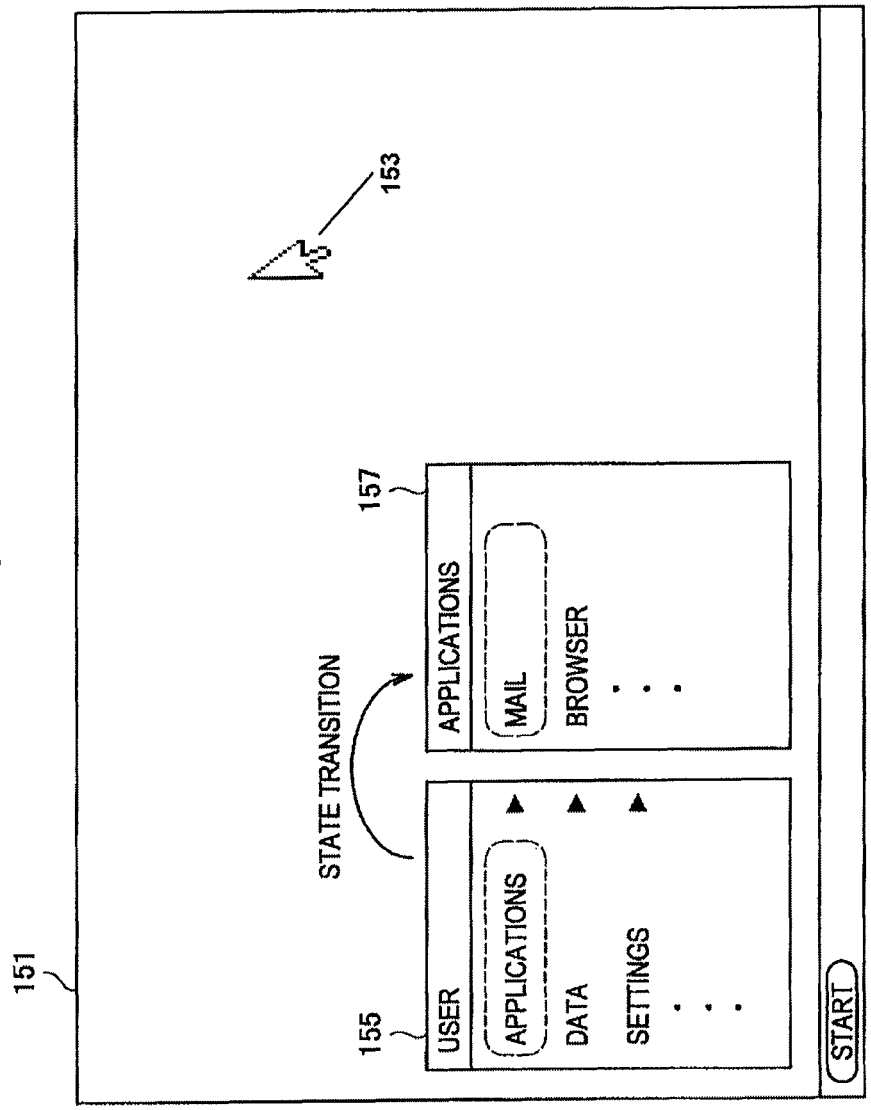
FIG. 2 is an explanatory diagram for illustrating a state transition of a display screen.

The transition of the display state will be hereinafter described with reference to FIG. 2. FIG. 2 is an explanatory diagram for illustrating a state transition of the display screen.

A user of the information processing apparatus 10 operates the input device such as a mouse so as to move a position selection object 153 such as a mouse pointer while seeing a display screen 151. For example, when the user selects a "start" button on the display screen 151 in order to display processings that can be executed by the information processing apparatus 10, a processing selection window 155 describing selectable processings is displayed on the display screen 151 as shown in FIG. 2. In this specification, the above change in the display screen from the display screen 151 not showing the processing selection window 155 to the display screen 151 showing the processing selection window 155 will be hereinafter referred to as "the display state has transited".

For example, when "application" is selected with the position selection object 153 from among the processings enumerated in the processing selection window 155, processings encompassed by the classification of "application" is displayed as a processing selection window 157 on the display screen 151. The above change from the state of the display screen showing only the processing selection window 155 to the state in which the "application" is selected from the processing selection window 155 with the position selection object 153 is also an example of the transition of the display state. Further, the change in display contents to the state in which both of the processing selection windows 155 and 157 are displayed on the display screen 151 upon selection of the "application" is also another example of the transition of the display state.

The state transition control unit 103 for controlling state transitions of the display screen 151 as described above further includes a cache control unit 105 and a state transition occurrence frequency analysis unit 107.

The cache control unit 105 is constituted by, for example, a CPU, a ROM, and a RAM. The cache control unit 105 predicts another display state to which the state may transit, based on the transition frequency database stored in the later-described storage unit 115 and the like and a display content displayed on a display screen, and prepares resource required by the another predicted display state before the transition occurs. The transition frequency database describes how frequently a transition may possibly occur from a certain display state to another display state in the information processing apparatus 10, as will be explained later. Accordingly, the cache control unit 105 obtains the display content currently displayed on the display screen obtained from the display control unit 111, and uses the obtained display content and the frequency described in the transition frequency database to assign priorities to state transitions that may possibly occur. Then, the resource required by a state assigned with a high priority is prepared before the transition actually occurs. The above-described cache control can reduce the amount of processing and improve the speed of the processing when a screen transition occurs.

In this embodiment, the above resource means hardware and software reserved for executing a certain processing on the information processing apparatus 10. More particularly, examples of the resource include a processing for caching data required to generate a certain display screen, a processing for decompressing compressed image data needed to generate the display screen onto a memory, and reserving a memory needed for these processings.

Figure 3:
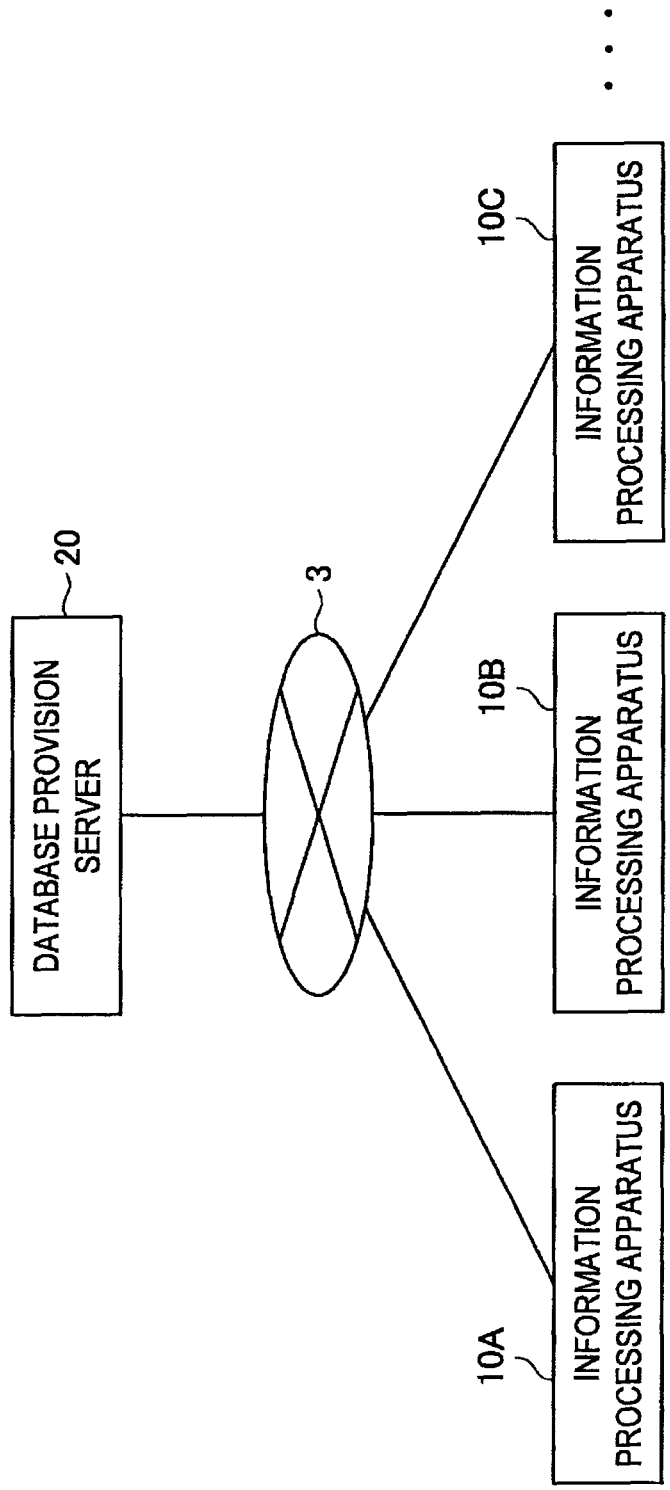
FIG. 3 is an explanatory diagram for illustrating the information processing apparatus according to the embodiment.

Further, the cache control unit 105 can transfer the transition frequency database to another apparatus arranged externally to the information processing apparatus 10 via the later-described communication control unit 113. For example, a case will be considered where a plurality of information processing apparatuses 10A, 10B, 10C, . . . are connected via a communication network 3, and a database provision server 20 is connected to the communication network 3 as shown in FIG. 3. In this case, the cache control unit 105 of the information processing apparatus 10A can transfer the transition frequency database stored in the information processing apparatus 10A to the database provision server 20 via the communication network 3. The cache control unit 105 of another information processing apparatus (for example, the information processing apparatus 10B) can obtain the transition frequency database stored in the database provision server 20, and can use the obtained transition frequency database for processings performed in the another information processing apparatus. Alternatively, the information processing apparatus 10 may directly obtain the transition frequency database from another information processing apparatus 10, instead of obtaining it via the database provision server 20.

In this embodiment, the communication network 3 is adapted to connect between an information processing apparatus 10 and another information processing apparatus 10 and between an information processing apparatuses 10 and the database provision server 20 so as to provide two-way communication or one-way communication. This communication network is made with, for example, a public communication network such as the Internet, a telephone network, a satellite communication network, and a multicasting communication network, and private communication network such as a WAN (Wide Area Network), a LAN (Local Area Network), an IP-VPN (Internet Protocol-Virtual Private Network), and a wireless LAN. The communication network may be connected via wire or may be connected wirelessly.

Further, the database provision server 20 stores and administers the transition frequency database transferred from the information processing apparatus 10. In reply to a request sent from the information processing apparatus 10, the database provision server 20 transfers the administered transition frequency database to the requesting information processing apparatus 10. Even if the same application is installed on information processing apparatuses, the contents of the transition frequency database for each of them are different depending on a behavior of a user using the apparatus. Therefore, the picture display processing can be performed efficiently on a newly purchased information processing apparatus by obtaining from the sever 20 the transition frequency database capable of, for example, improving the speed of picture display processing and using the obtained transition frequency database.

Figure 4:
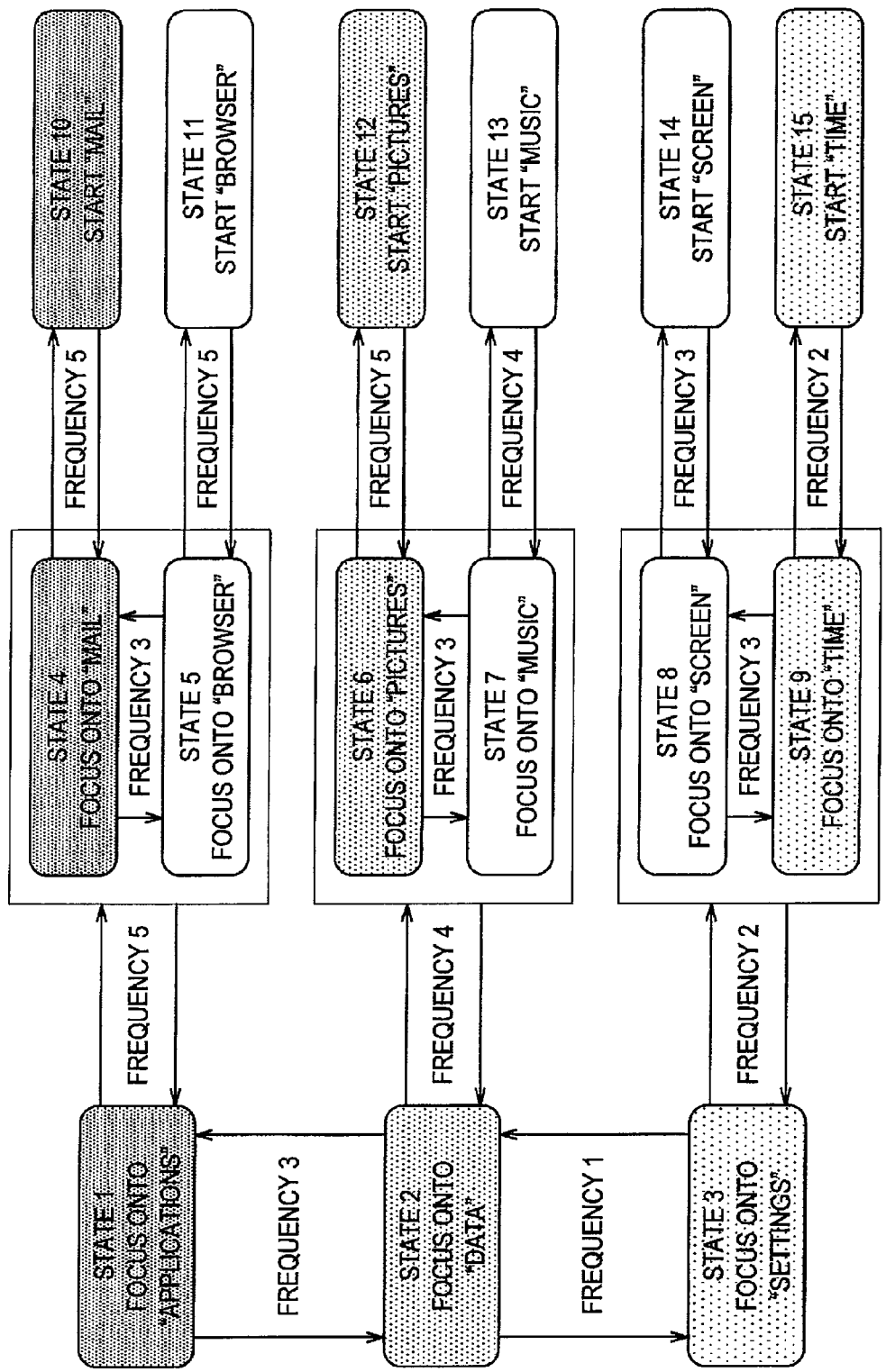
FIG. 4 is an explanatory diagram for illustrating a state transition of a display screen.

Subsequently, display states and their transitions will be described in detail using particular examples with reference to FIG. 4. FIG. 4 is an explanatory diagram for illustrating state transitions of display screens.

In the description below, when, e.g., the "start" button as shown in FIG. 2 is selected, it is assumed that the processing selection window 155 is shown to enumerate three kinds of processings, i.e., "applications", "data", and "settings." When "applications" is selected in the processing selection window 155, it is assumed that the processing selection window 157 is shown to enumerate the two kinds of processings, i.e., "mail" and "browser." Similarly, when "data" is selected in the processing selection window 155, it is assumed that the processing selection window 157 is shown to enumerate two kinds of genres, i.e., "pictures" and "music." When "settings" is selected in the processing selection window 155, it is assumed that the processing selection window 157 is shown to enumerate two kinds of processings, i.e., "screen" and "time."

In the above-described case, fifteen kinds of display states as shown in FIG. 4 may occur in the information processing apparatus 10. Frequencies are set for display state transitions that may occur, for example, a transition between state 1 and state 2 and a transition between state 1 and state 4. In FIG. 4, the frequencies are represented in five levels ranging from frequency 5 indicating the highest possibility of transition to frequency 1 indicating the lowest possibility of transition. These frequencies are data described in the transition frequency database. It should be noted that the representation of the frequency is not limited to five levels exemplified in the figure.

FIG. 4 indicates that the frequency of the transition from state 1 to state 4 or state 5 is frequency 5, and that the frequency of the transition from state 2 to state 6 or state 7 is frequency 4. Therefore, a user of the information processing apparatus 10 having frequency information as shown in FIG. 4 is determined to often use the mail function and the image display function. Since "settings" is a processing that is not needed to be changed frequently, the state transition to states related to "settings" occurs at a low frequency.

The cache control unit 105 according to the present embodiment preferentially performs a cache control, such as look-ahead reading of resource data, on a state transition that may occur frequently. This kind of cache control can reduce the amount of processing and improve the speed of processing when a screen transition occurs. In other words, in FIG. 4, when the display screen has transited to a state shown in state 1, the cache control unit 105 reads a resource required by state 4 or state 5 to which the display screen transits with frequency 5 at a higher preference than a resource required by state 2 to which the display screen transits with frequency 3. Therefore, a hit rate of look-ahead reading of resources in response to user's operation can be improved.

When it is possible to transit from a certain state to a plurality of states by the same number of steps, the cache control unit 105 does not perform look-ahead reading of resource data required by states to which a transition is less likely to occur. Therefore, the use of the cache memory can be saved, and the method for using the memory can be optimized. For example, in FIG. 4, it is possible to transit from state 2 to any of state 1, state 6, and state 3 by one step, but the cache control unit 105 does not perform look-ahead reading of resource required by state 1 and state 3 to which a transition is less likely to occur so as to save the use of the memory. As a result, a resource such as memory is allocated to another state assigned with a higher precedence (frequency), so that caching can be optimized.

The functions of the cache control unit 105 have been described hereinabove. The configuration of the information processing apparatus 10 according to the present embodiment will be hereinafter described in detail with reference back to FIG. 1.

The state transition occurrence frequency analysis unit 107 is constituted by, for example, a CPU, a ROM, and a RAM. The state transition occurrence frequency analysis unit 107 uses history information storing history of state transitions so as to analyze a frequency of occurrence of a state transition. Further, the state transition occurrence frequency analysis unit 107 updates the contents of the transition frequency database based on the analysis result. More specifically, the state transition occurrence frequency analysis unit 107 uses the number of state transitions occurred in the same runtime and the total number of state transitions so as to calculate the frequency of state transitions. In this specification, the runtime means from when the information processing apparatus 10 boots up and to when the information processing apparatus 10 shuts down.

When a state transition of a display screen occurs upon execution of an application or change of the display screen, the state transition occurrence frequency analysis unit 107 stores information about the date and time at which the state transition occurred as history information to the storage unit 115. This history information includes information about the date and time at which the state transition occurred and information about the occurred state transition (for example, information indicating that a transition occurred from state x to state y). Further, the state transition occurrence frequency analysis unit 107 makes it easy to determine whether a state transition occurs in the same runtime by, e.g., associating the history information with information uniquely decided every time the information processing apparatus 10 boots up and generating a folder and the like for storing a history on every boot. Therefore, the state transition occurrence frequency analysis unit 107 can recognize the number of state transitions occurred in the same runtime and the total number of state transitions.

This calculation processing of the frequencies of state transitions and the update processing of the transition frequency database will be described in detail later again.

The application execution unit 109 is constituted by, for example, a CPU, a ROM, and a RAM. When the application execution unit 109 receives a signal representing an application requested to run by user's operation with the input unit 101, the application execution unit 109 obtains a corresponding program and the like for the application from the storage unit 115, and executes the obtained program and the like. When the display content displayed on the display screen is to be changed due to the execution of the application, the application execution unit 109 requests the display control unit 111 to change the display content.

The display control unit 111 is constituted by, for example, a CPU, a ROM, and a RAM. The display control unit 111 obtains data, stored in the storage unit 115 and the like, corresponding to contents to be displayed on the display screen, and displays the data on the display screen. When the display control unit 111 receives from the input unit 101 a signal representing a movement of the position selection object such as a mouse pointer, the display control unit 111 displays the movement of the position selection object on the display screen in accordance with the received signal. When the display control unit 111 receives from the input unit 101 a signal indicating that a certain processing is selected in the processing selection window as shown in FIG. 2, the display control unit 111 references state transition specifications describing specifications of transitions of display contents, and displays a new processing selection window on the display screen. When the application execution unit 109 requests the display control unit 111 to change the display content, the display control unit 111 changes the display content displayed on the display screen, based on the request sent from the application execution unit 109.

When the display control unit 111 receives an inquiry about the display content currently being displayed on the display screen from the state transition control unit 103 and the cache control unit 105, the display control unit 111 transfers information about the display content being displayed on the display screen to a processing unit that sent the inquiry.

The communication control unit 113 is constituted by, for example, a CPU, a ROM, a RAM, and a communication device. The communication control unit 113 controls a communication between the information processing apparatus 10 and an apparatus arranged externally to the information processing apparatus 10. An example of the apparatus arranged externally to the information processing apparatus 10 includes the database provision server 20 connected via the communication network 3 as shown in FIG. 3.

The storage unit 115 stores the state transition specifications describing the specifications of transitions of display contents. For example, the storage unit 115 describes "what kind of contents are to be displayed on a new processing selection window, when a processing is selected from among the processings displayed on the processing selection window." Further, the storage unit 115 stores the history information about history of state transitions having occurred. The storage unit 115 also stores the transition frequency database. The storage unit 115 also stores object data to be displayed on the display screen. The object data referred to herein includes, for example, any part constituting graphical user interface (hereinafter referred to as GUI) such as an icon, a button, and a thumbnail.

The storage unit 115 may also store, as necessary, intermediate data and various parameters or various databases, which are to be saved when the information processing apparatus 10 according to the present embodiment performs a certain processing. This storage unit 115 can be freely read and written by the input unit 101, the state transition control unit 103, the cache control unit 105, the state transition occurrence frequency analysis unit 107, the application execution unit 109, the display control unit 111, the communication control unit 113, and the like.

Figure 5:
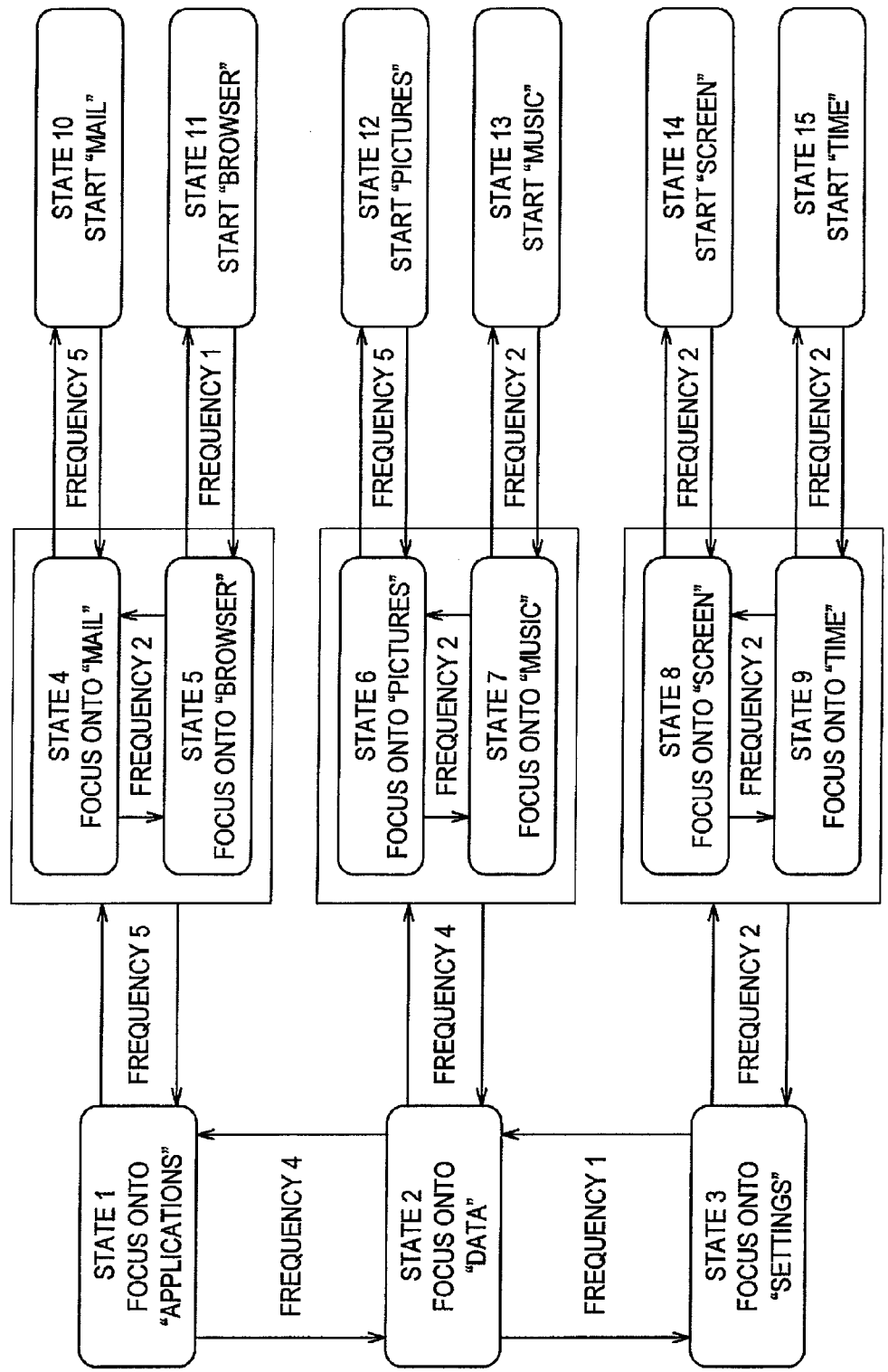
FIG. 5 is an explanatory diagram for illustrating a state transition of a display screen.
Figure 7:
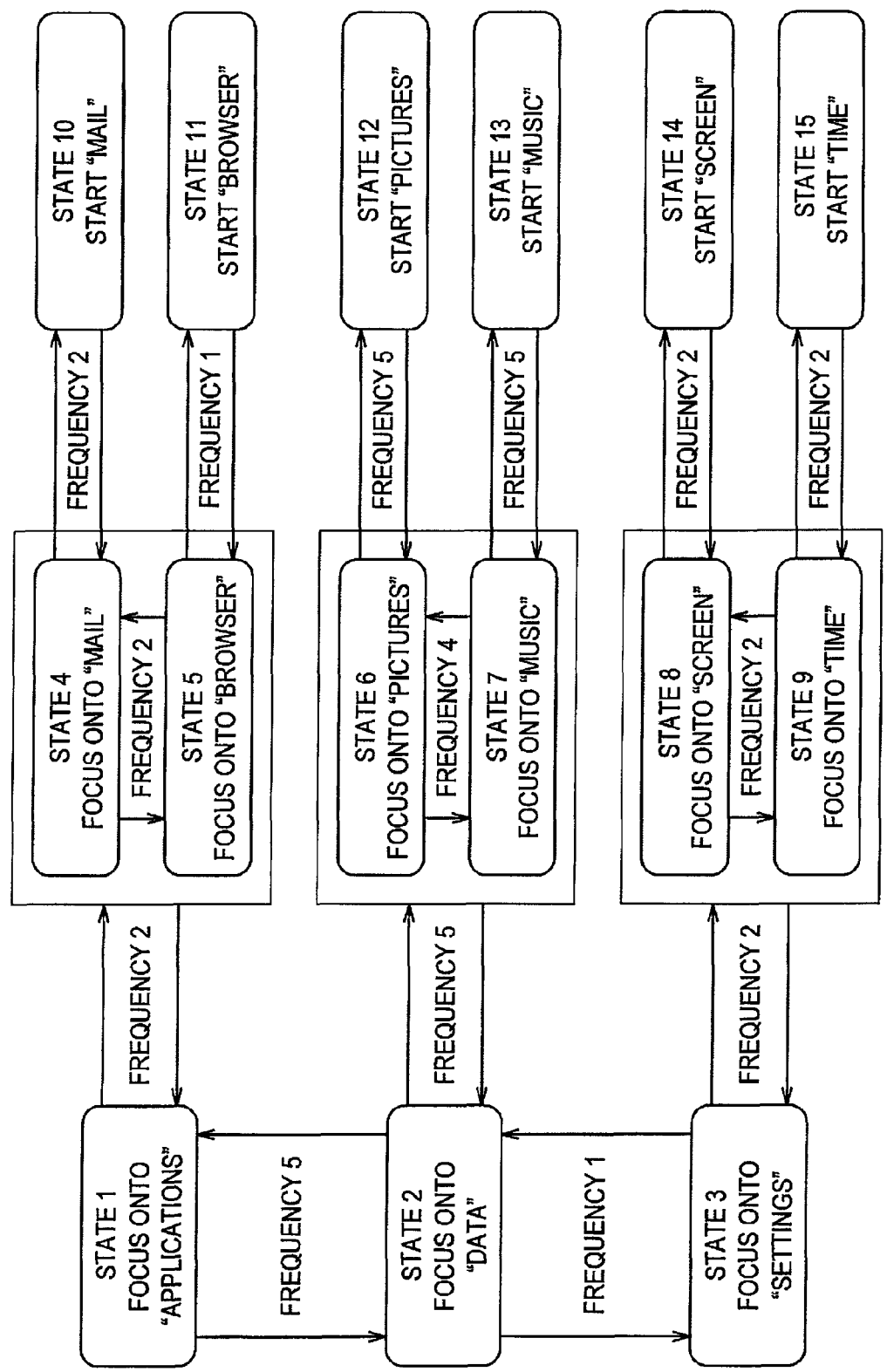
FIG. 7 is an explanatory diagram for illustrating a state transition of a display screen.

The transition frequency database will be described in detail using examples with reference to FIG. 5 to FIG. 8. FIG. 5 and FIG. 7 are explanatory diagrams for illustrating state transitions of display screens. FIG. 6 and FIG. 8 are explanatory diagrams for illustrating an example of the transition frequency database.

The transition frequency database according to the present embodiment represents transition frequencies from a certain state to another state in a matrix form. This transition frequency database is updated by the state transition occurrence frequency analysis unit 107 based on occurred state transitions. Therefore, even if the information processing apparatuses 10 have the same application, the transition frequency database for each of them is different from each other depending on a preference of a user.

FIG. 5 shows an example of state transitions of a user who is interested in viewing pictures and who often sends and receives e-mails. This kind of user frequently selects "applications" to transit to a selection screen of "mail", and frequently selects "data" to transit to a selection screen of "pictures." Therefore, as shown in FIG. 5, a transition frequency from state 1 to state 4 or state 5 is frequency 5, and the transition frequency from state 2 to state 6 or state 7 is frequency 4.

The transition frequency database represents the transition frequencies as shown in FIG. 5 in a matrix form. FIG. 6 shows a transition frequency database corresponding to the transition frequencies as shown in FIG. 5. In FIG. 6, states arranged in a column in a vertical direction respectively correspond to states before transitions, and states arranged in a horizontal direction respectively correspond to states after transitions. As is evident from comparing FIG. 5 and FIG. 6, for example, an element at an intersection point of the matrix between "state 1" in the vertical direction and "state 2" in the horizontal direction denotes the transition frequency from state 1 to state 2. In FIG. 5 and FIG. 6, it is "4".

On the other hand, FIG. 7 shows an example of state transitions of a user who is interested in viewing pictures and listening to music. This kind of user frequently moves the position selection object from "applications" to "data" by operating the position selection object, and frequently selects "data" to transit to a selection screen of "pictures" or "music." Therefore, as shown in FIG. 7, a transition frequency from state 1 to state 2 is frequency 5, and the transition frequency from state 2 to state 6 or state 7 is frequency 5. In contrast to the user shown in FIG. 5 and FIG. 6, the user shown in FIG. 7 has the transition frequency of 2 from state 1 to state 4 or state 5.

FIG. 8 is a transition frequency database corresponding to FIG. 7, but the transition frequency database of FIG. 8 is different from the transition frequency database shown in FIG. 6. As described above, the transition frequency database reflects preferences of a user who uses the information processing apparatus 10. For example, when the transition frequency database is shared via the database provision server 20 as shown in FIG. 3, a cache control on a function used less frequently in another apparatus can be performed immediately in an efficient manner.

In FIG. 5 to FIG. 8, a transition frequency from state x to state y is the same as a transition frequency from state y to state x. But the transition frequency from state x to state y may be allowed to be different from the transition frequency from state y to state x. This configuration achieves a more precise cache control and further improves convenience for users.

Exemplary functions of the information processing apparatus 10 according to the present embodiment have been described hereinabove. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the technical level at the time of carrying out the present embodiment.

It is possible to make a computer program for realizing the functions of the above-described information processing apparatus according to the present embodiment, and the computer program can be implemented on a personal computer and the like. Further, a computer-readable recording medium storing such computer program can be provided. Examples of the recording medium include a magnetic disk, an optical disk, a magneto-optical disk, and a flash memory. Further, the above computer program may be distributed by, for example, a network, without using the recording medium.

<Regarding Information Processing Method>

Figure 9:
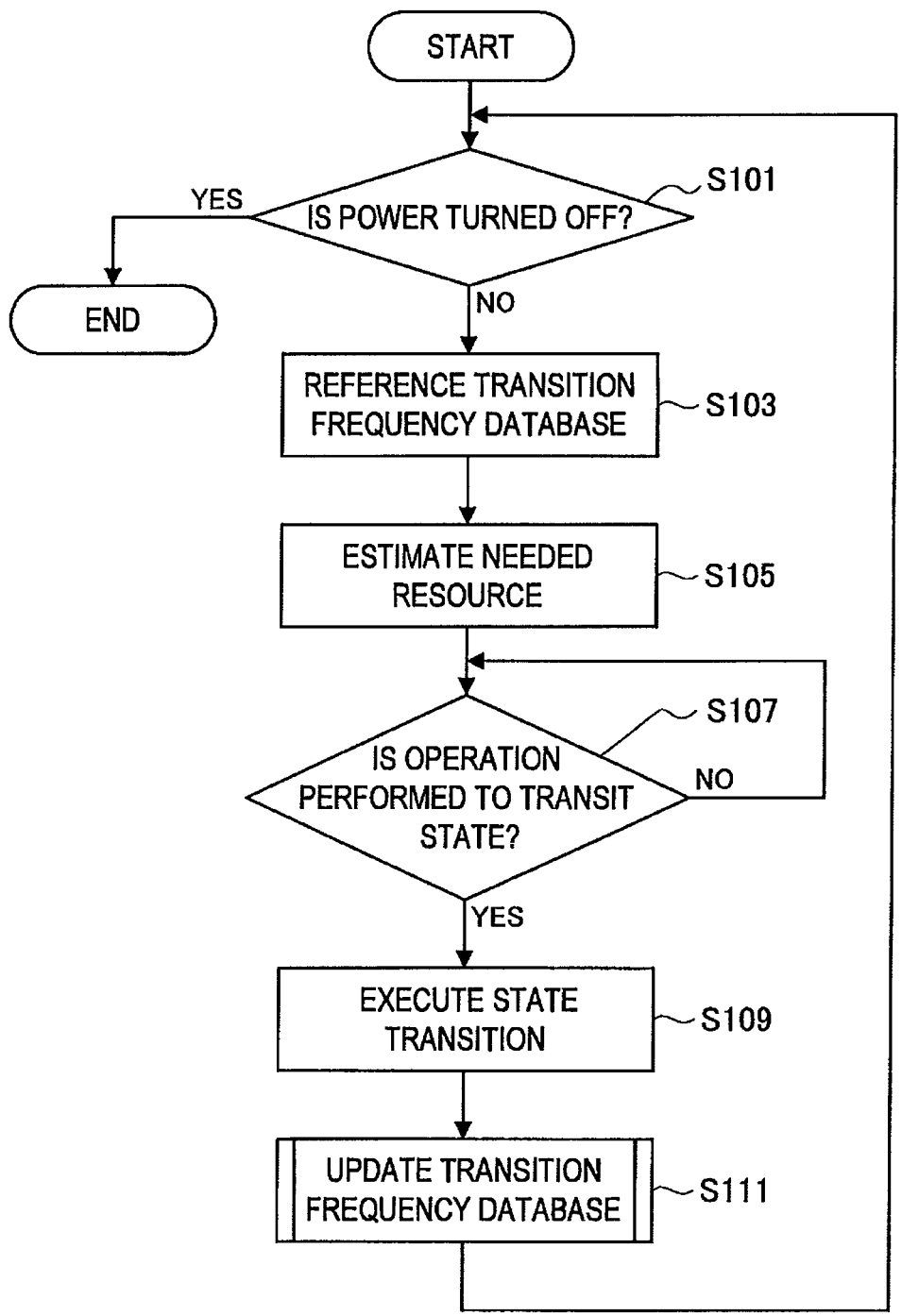
FIG. 9 is a flow diagram for illustrating an information processing method according to the embodiment.

The information processing method according to the present embodiment (more specifically, a prediction method of the cache) will be hereinafter described in detail with reference to FIG. 9. FIG. 9 is a flowchart for illustrating the information processing method according to the present embodiment.

The input unit 101 arranged on the information processing apparatus 10 booting up makes a determination as to whether operation is performed to turn off the information processing apparatus 10 (step S101). When the operation is performed to turn off the information processing apparatus 10, the information processing apparatus 10 terminates processings and shuts down. When the operation is not performed to turn off the information processing apparatus 10, the information processing apparatus 10 performs the following processings.

First, the cache control unit 105 arranged on the state transition control unit 103 obtains a display content currently displayed on a display screen (i.e., a current display state) from the display control unit 111. Subsequently, the cache control unit 105 references the transition frequency database stored in the storage unit 115 (step S103), and predicts a display state to which the current display state may possibly transit. Thereafter, the cache control unit 105 inquires the application execution unit 109, the display control unit 111, or the like based on the prediction result so as to predict the required resource (step S105), and performs processings such as reserving a memory and decompressing a compressed image.

While the cache control unit 105 performs the prediction process as described above, the information processing apparatus 10 waits for receiving an input of operation that causes a state transition (step S107). When the information processing apparatus 10 receives an input of operation that causes a state transition, the input unit 101 notifies the application execution unit 109 or the display control unit 111 to that effect, so that the application execution unit 109 or the display control unit 111 executes the state transition (step S109). The state transition occurrence frequency analysis unit 107 stores history information generated by the execution of the state transition to the storage unit 115.

Next, the state transition occurrence frequency analysis unit 107 arranged on the state transition control unit 103 uses the history information stored in the storage unit 115 to perform an update processing of the transition frequency database (step S111).

Subsequently, the information processing apparatus 10 returns back to step S101 again to continue the prediction processing of the cache.

The information processing apparatus 10 according to the present embodiment can perform active caching by predicting the cache according to the above-described flow.

[Regarding Update Processing of Transition Frequency Database]

Figure 10:
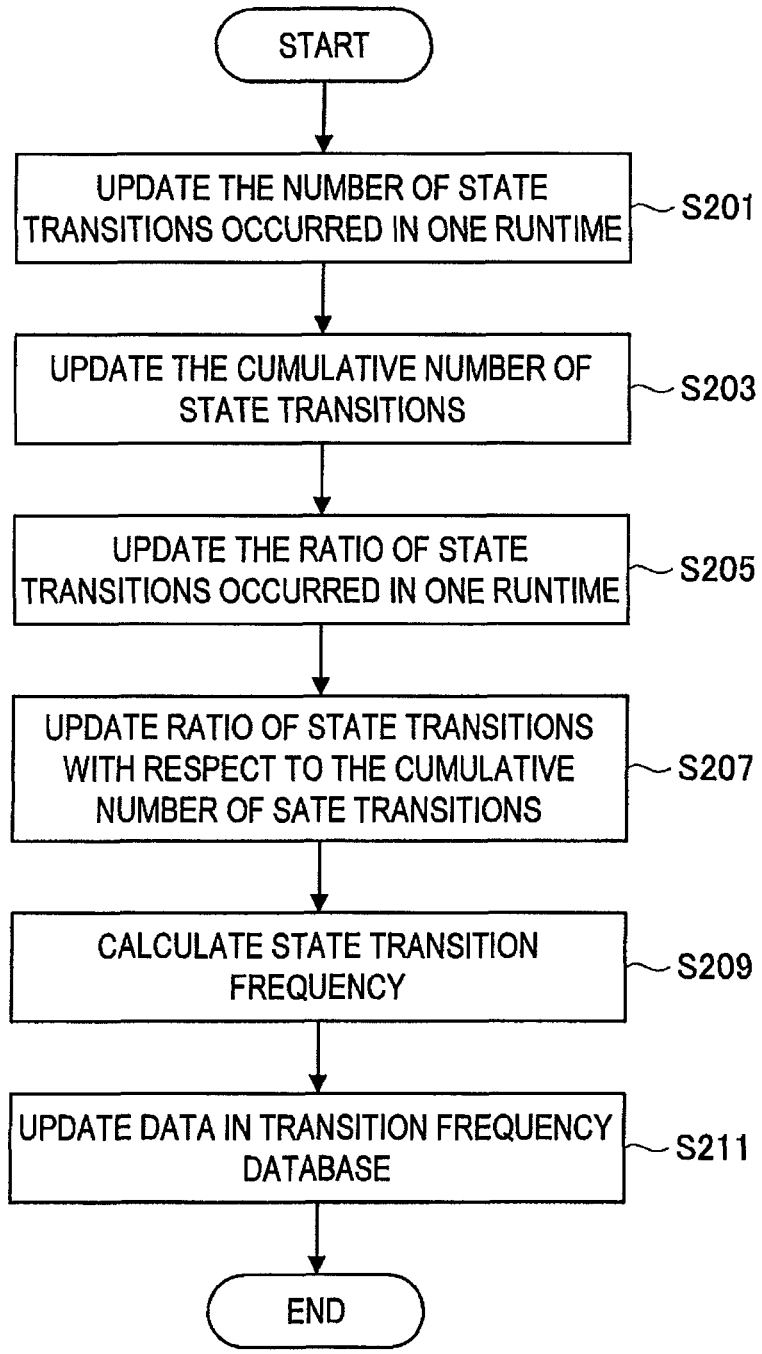
FIG. 10 is a flow diagram for illustrating an information processing method according to the embodiment.

Next, the update processing of the transition frequency database performed by the state transition occurrence frequency analysis unit 107 will be described in detail with reference to FIG. 10. FIG. 10 is a flowchart for illustrating the update processing of the transition frequency database.

The state transition occurrence frequency analysis unit 107 according to the present embodiment analyses frequencies of state transitions based on the number of state transitions occurred at the same runtime and the total number of state transitions, and uses the obtained analysis result to update the contents of the transition frequency database.

The update processing of the transition frequency database caused by a transition from state x to state y (hereinafter referred to as transition A) will be hereinafter explained as an example.

When the state transition of the display screen occurs, the state transition occurrence frequency analysis unit 107 updates a portion of history information, i.e., the number of transitions A occurred in the same runtime (step S201). Subsequently, the state transition occurrence frequency analysis unit 107 updates the total number of transitions A (step S203). As a result of these processings, the information processing apparatus 10 can store two kinds of data as the history information, i.e., the number of transitions A occurred in the same run time and the total number of transitions A.

Subsequently, the state transition occurrence frequency analysis unit 107 calculates a ratio of the transitions A with respect to the number of all of the transitions occurred in the same runtime until then (hereinafter, this ratio is referred to as Rc), and updates corresponding history information (step S205). For example, if state transitions have occurred 100 times in the same runtime until then, and the transitions A have occurred 10 times out of the 100 times, Rc is 0.1. Similarly, the state transition occurrence frequency analysis unit 107 uses the total number of all of the transitions (cumulative amount) and the total number of transitions A to calculate a ratio of the total number of transitions A (hereinafter, this ratio is referred to as Rt), and updates corresponding history information (step S207).

Subsequently, the state transition occurrence frequency analysis unit 107 uses a predetermined method to calculate a state transition frequency (hereinafter, this frequency is referred to as R) (step S209). The method for calculating the state transition frequency R is not limited to a particular method, and any method can be used therefor. For example, R may be an arithmetic average of Rc and Rt. Alternatively, where a weighting coefficient by which Rc is multiplied is r, and a weighting coefficient by which Rt is multiplied is t, R may be obtained as R=(r·Rc+t·t)/(r+t).

Subsequently, the state transition occurrence frequency analysis unit 107 compares the calculated state transition frequency R with a predetermined reference to obtain a new frequency of the transition A. The used reference is not particularly limited. The following references may be used, when five levels of frequencies are determined using the state transition frequency R=f (Rc, Rt), in which the weighting function f is adjusted to derive a value between 0 and 1.

$0.0 \leq R < 0.2$: Frequency 1
$0.2 \leq R < 0.4$: Frequency 2
$0.4 \leq R < 0.6$: Frequency 3
$0.6 \leq R < 0.8$: Frequency 4
$0.8 \leq R < 1.0$: Frequency 5

For example, the state transition occurrence frequency analysis unit 107 uses the new frequency determined according to the above-described method to update data in the transition frequency database (step S211).

The state transition occurrence frequency analysis unit 107 can update the contents of the transition frequency database using the above-described method. This update processing enables the information processing apparatus 10 to perform a cache control reflecting user's preferences.

<Regarding Hardware Configuration>

Figure 11:
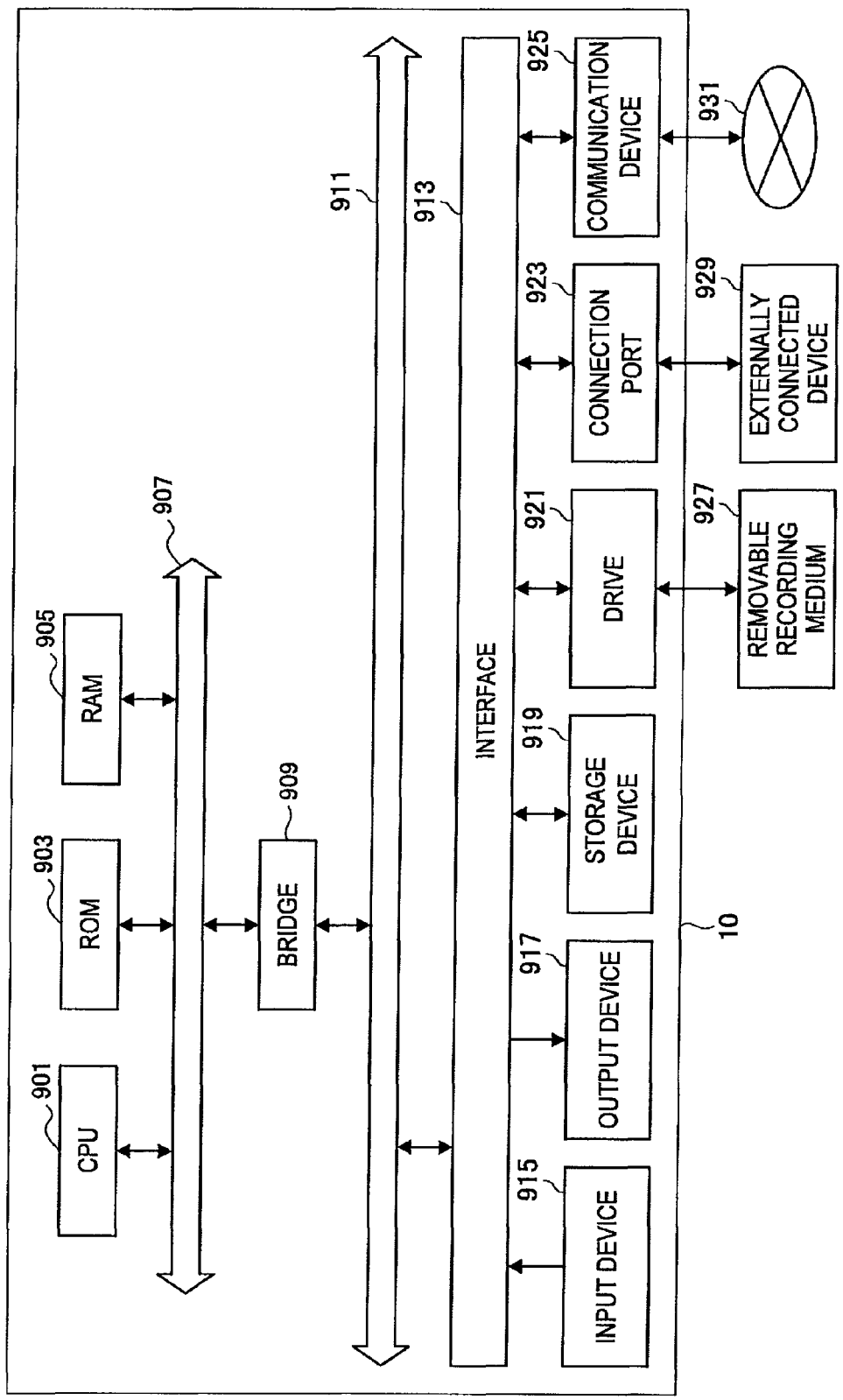
FIG. 11 is a block diagram for illustrating a hardware configuration of an information processing apparatus according to each embodiment of the present invention.

Subsequently, the hardware configuration of the information processing apparatus 10 according to each embodiment of the present invention will be described in detail with reference to FIG. 11. FIG. 11 is a block diagram for illustrating the hardware configuration of the information processing apparatus 10 according to each embodiment of the present invention.

The information processing apparatus 10 mainly includes a CPU 901, a ROM 903, and a RAM 905. The information processing apparatus 10 further includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and control apparatus to control overall operation or a portion of operation in the information processing apparatus 10 in accordance with various programs stored in the ROM 903, the RAM 905, the storage device 919, or a removable recording medium 927. The ROM 903 stores programs, operation parameters, and the like used by the CPU 901. The RAM 905 primarily stores programs used during execution of the CPU 901 and parameters and the like varying during the execution as necessary. These are connected with each other via the host bus 907 constituted by an internal bus such as a CPU bus.

The host bus 907 is connected to the external bus 911 such as a PCI (Peripheral Component Interconnect/Interface) via the bridge 909.

The input device 915 is operation means operated by a user, such as a mouse, a keyboard, a touch panel, buttons, switches and levers. The input device 915 may be remote control means (a so-called remote controller) using, for example, infrared light and other radio waves, or may be an externally connected device 929 such as a portable telephone and a PDA adapted to operate the information processing apparatus 10. The input device 915 generates an input signal based on, for example, information input by a user with the above operation means, and is constituted by an input control circuit for outputting the input signal to the CPU 901. A user of the information processing apparatus 10 operates this input device 915 to input various data to the information processing apparatus 10 and instructs the information processing apparatus 10 to perform processings and operation.

The output device 917 is constituted by a device capable of audibly or visually notifying obtained information to a user. Examples of the output device 917 include display devices such as a CRT display device, a liquid crystal display device, a plasma display device, an EL display device, and lamps, audio output devices such as a speaker and a headphone, a printer, a portable telephone, and a facsimile machine. The output device 917 outputs a result obtained from various processings performed by, for example, the information processing apparatus 10. More specifically, the display device displays a result, as texts or images, obtained from various processings performed by the information processing apparatus 10. On the other hand, the audio output device converts an audio signal such as reproduced audio data and sound data into an analog signal, and outputs the analog signal.

The storage device 919 is an example of a storage unit of the information processing apparatus 10 and is adapted to store data. The storage device 919 is constituted by, for example, a magnetic storage device such as a HDD (Hard Disk Drive), a semiconductor storage device, an optical storage device, or a magneto-optical storage device. This storage device 919 stores, for example, programs and various data executed by the CPU 901 and various data obtained from the outside.

The drive 921 is a reader/writer for recording medium, and is embedded in the information processing apparatus 10 or attached externally thereto. The drive 921 reads information stored in the loaded removable recording medium 927 such as a magnetic disk, an optical disk, a magneto-optical disk, or a semiconductor memory, and outputs the read information to the RAM 905. The drive 921 can record the loaded removable recording medium 927 such as a magnetic disk, an optical disk, a magneto-optical disk, or a semiconductor memory. The removable recording medium 927 is, for example, a DVD medium, an HD-DVD medium, and a Blu-ray medium. The removable recording medium 927 may be a CompactFlash (registered trademark) (CompactFlash: CF), a memory stick, or an SD memory card (Secure Digital Memory Card). Alternatively, the removable recording medium 927 may be, for example, an IC card (Integrated Circuit Card) mounted with a non-contact IC chip or an electronic appliance.

The connection port 923 is a port for allowing apparatuses to directly connect to the information processing apparatus 10. Examples of the connection port 923 include a USB (Universal Serial Bus) port, an IEEE 1394 port such as i.Link, and a SCSI (Small Computer System Interface) port. Other examples of the connection port 923 include an RS-232C port, an optical audio terminal, and an HDMI (High-Definition Multimedia Interface) port. When the externally connected device 929 is connected to this connection port 923, the information processing apparatus 10 directly obtains various data from the externally connected device 929 and provides various data to the externally connected device 929.

The communication device 925 is a communication interface constituted by, for example, a communication device for connecting to a communication network 931. The communication device 925 is, for example, a wired or wireless LAN (Local Area Network), Bluetooth, or a communication card for WUSB (Wireless USB). Alternatively, the communication device 925 may be a router for optical communication, a router for ADSL (Asymmetric Digital Subscriber Line), or a modem for various communications. This communication device 925 can transmit and receive signals and the like in accordance with a predetermined protocol such as TCP/IP with, for example, the Internet and other communication apparatuses. The communication network 931 connected to the communication device 925 is constituted by a network and the like connected via wire or connected wirelessly. For example, the communication network 931 may be the Internet, a home LAN, an infrared communication, a radio wave communication, or a satellite communication.

An example of hardware configuration capable of achieving the functions of the information processing apparatus 10 according to each embodiment of the present invention has been described hereinabove. Each of the above constituent elements may be made using a generally-used member, or may be made with hardware dedicated for the function of the constituent element. Therefore, the used hardware configuration can be changed as necessary in accordance with the technical level at the time of carrying out the present embodiment.

SUMMARY

As hereinabove described, the information processing apparatus and the information processing method according to the embodiments of the present invention predict a state transition that may possibly occur from now on using the transition frequency database describing information about frequencies of occurrences of state transitions based on a change of display content displayed on a display screen. The information processing apparatus and the information processing method according to the embodiments of the present invention perform the cache control for reading a resource needed by the predicted state transition in advance, thus capable of reducing a load during the state transition, improving the speed of the state transition, and optimizing the cache memory.

The information processing apparatus can transfer the transition frequency database to a database provision server arranged externally. The database provision server administers the transition frequency database provided by each information processing apparatus, and provides the administered transition frequency database to an information processing apparatus requesting the transition frequency database. Therefore, the information processing apparatus having received the transition frequency database can tune the cache control on a function used less frequently.

It should be understood by those skilled in the art that various modifications, combinations, sub-combinations and alterations may occur depending on design requirements and other factors insofar as they are within the scope of the appended claims or the equivalents thereof.

For example, state transitions caused by screen transitions have been described as an example in the above embodiments, but the present invention is not limited thereto. For example, the present invention can be applied to a state transition occurring without a screen transition such as a message communication.

In the above embodiments, a state transition occurring one step ahead is used for the explanation, but the look-ahead reading of state transition is not limited to one step ahead, and maybe any steps ahead such as two steps ahead and three steps ahead.

The present application contains subject matter related to that disclosed in Japanese Priority Patent Application JP 2009-008029 filed in the Japan Patent Office on 16 Jan. 2009, the entire content of which is hereby incorporated by reference.

What is claimed is:

1. An information processing network comprising:
a first information processing apparatus;
a second information processing apparatus; and
a database provision server,
wherein the first information processing apparatus comprises:
a storage unit for storing a transition frequency database storing transition frequency information representing a frequency of a state transition of a display content displayed on a display screen from a display state displaying the display content to another display state;
a communication control unit configured to communicate with the database provision server, wherein the transition frequency database is transferred to the database provision server via the communication control unit, and wherein the database provision server provides the transition frequency database to a cache control unit of the second information processing apparatus;
a state transition occurrence frequency analysis unit for analyzing an occurrence frequency of the state transition, wherein the state transition occurrence frequency analysis unit calculates both a frequency of the state transition based on the number of state transitions occurring in a same runtime and the total number of state transitions, and wherein the occurrence frequency of a particular state transition is represented by one of five distinct levels; and
a cache control unit for predicting the another display state to which a transition may occur based on the transition frequency database and the display content displayed on the display screen, and preparing a resource needed by the another predicted display state before the transition occurs only if the occurrence frequency of the predicted display state is represented by one of the two levels indicating the highest occurrence frequency,
wherein the second information processing apparatus is configured to obtain the transition frequency database directly from the first information processing apparatus via a communication network.

2. The information processing network according to claim 1, wherein the state transition occurrence frequency analysis unit updates a content of the transition frequency database based on the analysis result.

3. An information processing method, comprising the steps of:
predicting another display state to which a transition may occur, based on a transition frequency database storing transition frequency information representing a frequency of a state transition of a display content displayed on a display screen from a display state displaying the display content to the another display state and the display content displayed on the display screen;

communicating the transition frequency database to a database provision server, wherein the database provision server is configured to provide the transition frequency database to at least one information processing apparatus;

transferring directly the transition frequency database from a first information processing apparatus to a second information processing apparatus via a communication network;

calculating a frequency of the state transition based on the number of state transitions occurring in a same runtime and the total number of state transitions, wherein the frequency of a particular state transition is represented by one of five distinct levels; and preparing a resource needed by the another predicted display state before the transition occurs only if the occurrence frequency of the predicted display state is represented by one of the two levels indicating the highest occurrence frequency.

4. A non-transitory, computer-readable medium comprising instructions for causing a computer having a display screen to execute the steps of:

predicting another display state to which a transition may occur, based on a transition frequency database storing transition frequency information representing a frequency of a state transition of a display content displayed on the display screen from a display state displaying the display content to the another display state and the display content displayed on the display screen;

communicating the transition frequency database to a database provision server, wherein the database provision server is configured to provide the transition frequency database to at least one information processing apparatus;

transferring directly the transition frequency database from a first information processing apparatus to a second information processing apparatus via a communication network;

calculating a frequency of the state transition based on the number of state transitions occurring in a same runtime and the total number of state transitions, wherein the frequency of a particular state transition is represented by one of five distinct levels; and preparing a resource needed by the another predicted display state before the transition occurs only if the occurrence frequency of the predicted display state is represented by one of the two levels indicating the highest occurrence frequency.

\* \* \* \* \*